(12) United States Patent
Purdy

(10) Patent No.: US 11,028,572 B2
(45) Date of Patent: *Jun. 8, 2021

(54) SYSTEM AND METHOD FOR PRIMARILY ERECTING CURVILINEAR BUILDINGS USING A PLURALITY OF INTERCONNECTED STRUCTURAL TUBES/SANDWICH PANELS

(71) Applicant: Jason Elliott Purdy, Boston, MA (US)

(72) Inventor: Jason Elliott Purdy, Boston, MA (US)

( * ) Notice: Subject to any disclaimer, the term of this patent is extended or adjusted under 35 U.S.C. 154(b) by 294 days.

This patent is subject to a terminal disclaimer.

(21) Appl. No.: 16/184,378

(22) Filed: Nov. 8, 2018

(65) Prior Publication Data

US 2019/0071889 A1  Mar. 7, 2019

Related U.S. Application Data

(60) Continuation of application No. 14/162,433, filed on Jan. 23, 2014, now Pat. No. 10,125,515, which is a
(Continued)

(51) Int. Cl.
*E04B 1/16* (2006.01)
*B32B 1/00* (2006.01)
(Continued)

(52) U.S. Cl.
CPC ............. *E04B 1/169* (2013.01); *B29C 44/06* (2013.01); *B29D 99/0021* (2013.01);
(Continued)

(58) Field of Classification Search
CPC ............. B29C 44/06; B29D 99/0021; B29D 99/0089; B32B 1/00; B32B 1/02; B32B 1/08; B32B 3/12; B32B 5/04; B32B 5/18; B32B 5/22; B32B 27/065; E04B 1/00; E04B 1/12; E04B 1/165; E04B 1/167; E04B 1/168; E04B 1/169; E04B 1/3211; E04C 2/296; E04C 2/328; Y10T 428/1352;
(Continued)

(56) References Cited

U.S. PATENT DOCUMENTS 8,668,974 B2 * 3/2014 Purdy .................. B32B 27/065
428/36.4
10,125,515 B2 * 11/2018 Purdy .................... E04C 2/328

* cited by examiner

*Primary Examiner* — Walter Aughenbaugh
(74) *Attorney, Agent, or Firm* — Preti Flaherty Beliveau & Pachios LLP

(57) ABSTRACT

A system and method for primarily erecting curvilinear buildings using a plurality of interconnected structural tubes/sandwich panels is provided. Fabricating structural tubing comprises: connecting a fibrous and flexible lining to an inner surface of a flexible outer membrane, wherein the lining is saturated in a curable material that forms into a solid foam material when cured; and curing the curable material. Fabricating a sandwich panel comprises: connecting a first fibrous and flexible lining to an inner surface of a first flexible outer membrane, wherein the first lining is saturated in a curable material that forms into a solid foam when cured; connecting a second fibrous and flexible lining to an inner surface of a second flexible outer membrane, wherein the second lining is saturated in a curable material that forms into a solid foam when cured; and curing the curable material of the first lining and second linings.

17 Claims, 15 Drawing Sheets

Related U.S. Application Data division of application No. 12/540,226, filed on Aug. 12, 2009, now Pat. No. 8,668,974.

(60) Provisional application No. 61/088,364, filed on Aug. 13, 2008.

(51) Int. Cl.
| | |
|---|---|
| *B32B 1/02* | (2006.01) |
| *B29C 44/06* | (2006.01) |
| *B29D 99/00* | (2010.01) |
| *B32B 1/08* | (2006.01) |
| *E04B 1/00* | (2006.01) |
| *E04B 1/12* | (2006.01) |
| *E04B 1/32* | (2006.01) |
| *E04C 2/296* | (2006.01) |
| *E04C 2/32* | (2006.01) |
| *B32B 5/18* | (2006.01) |
| *B32B 27/06* | (2006.01) |
| *B32B 3/12* | (2006.01) |
| *B32B 5/04* | (2006.01) |
| *B32B 5/22* | (2006.01) |
| *E04H 15/20* | (2006.01) |

(52) U.S. Cl.
CPC ............ *B29D 99/0089* (2013.01); *B32B 1/00* (2013.01); *B32B 1/02* (2013.01); *B32B 1/08* (2013.01); *B32B 3/12* (2013.01); *B32B 5/04* (2013.01); *B32B 5/18* (2013.01); *B32B 5/22* (2013.01); *B32B 27/065* (2013.01); *E04B 1/00* (2013.01); *E04B 1/12* (2013.01); *E04B 1/165* (2013.01); *E04B 1/167* (2013.01); *E04B 1/168* (2013.01); *E04B 1/3211* (2013.01); *E04C 2/296* (2013.01); *E04C 2/328* (2013.01); *E04H 15/20* (2013.01); *B32B 2250/40* (2013.01); *B32B 2266/0278* (2013.01); *B32B 2419/00* (2013.01); *E04B 2001/0053* (2013.01); *E04B 2001/0061* (2013.01); *E04B 2001/327* (2013.01); *E04B 2001/3235* (2013.01); *Y10T 428/1352* (2015.01); *Y10T 428/1362* (2015.01); *Y10T 428/1372* (2015.01); *Y10T 428/1376* (2015.01); *Y10T 428/1379* (2015.01); *Y10T 428/1393* (2015.01); *Y10T 428/23* (2015.01); *Y10T 428/231* (2015.01); *Y10T 428/233* (2015.01); *Y10T 428/234* (2015.01); *Y10T 428/236* (2015.01); *Y10T 428/249953* (2015.04)

(58) Field of Classification Search
CPC ........... Y10T 428/1386; Y10T 428/139; Y10T 428/1393; Y10T 428/1397; Y10T 428/1362; Y10T 428/1372; Y10T 428/1376; Y10T 428/1379; Y10T 428/231; Y10T 428/233; Y10T 428/234; Y10T 428/236; Y10T 428/249953
See application file for complete search history.

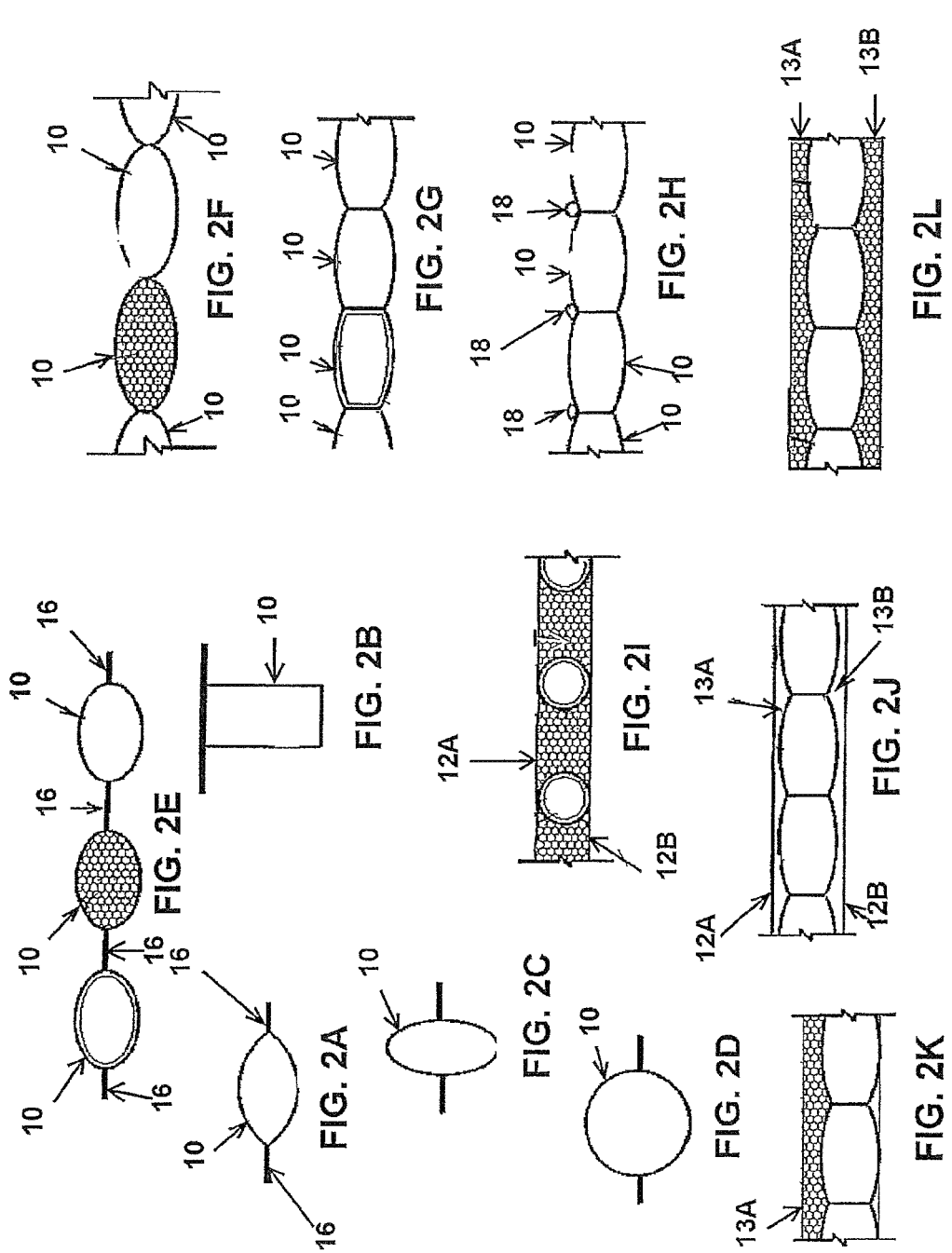

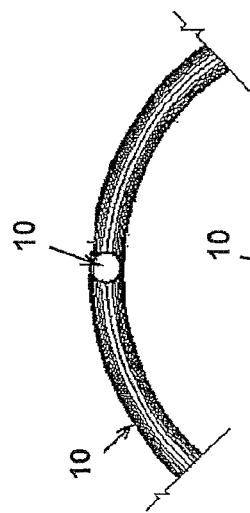
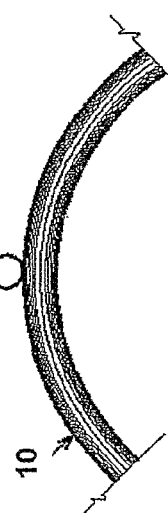
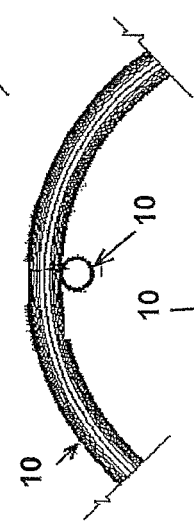
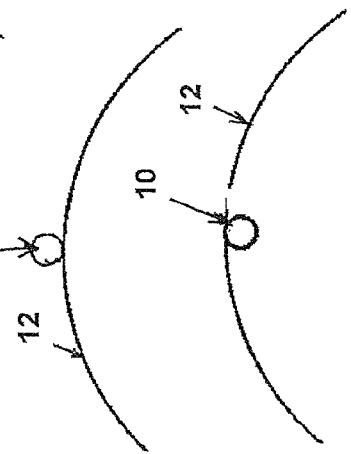
FIG. 8A
FIG. 8B
FIG. 8C
FIG. 8D
FIG. 8E

SYSTEM AND METHOD FOR PRIMARILY ERECTING CURVILINEAR BUILDINGS USING A PLURALITY OF INTERCONNECTED STRUCTURAL TUBES/SANDWICH PANELS

STATEMENT REGARDING FEDERALLY SPONSORED RESEARCH OR DEVELOPMENT

N/A

BACKGROUND OF THE INVENTION

The present invention relates generally to curvilinear buildings, and more specifically, to the erecting of curvilinear building using a plurality of interconnected structural tubes and/or sandwich panels.

Curvilinear design is an underutilized construction strategy which is known to enclose space with ten to twenty percent less material than conventional rectangular structures, provide structural stability with less material, resist the impact of wind and water more efficiently than rectangular structures, and offer significant energy savings in operating cost. Unlike many initiatives in building today that are promoted as energy-saving and cost-effective, such as solar collector panels or high tech insulation, curvilinear design addresses the fundamental factor—the shape of the structure—which drives up material and energy costs. The conventional rectangular building is inherently less energy efficient and more costly to build and operate.

The benefits of curvilinear design in structures for living and for enterprise have long been recognized, from the yurt housing of nomadic tribes to round barns in America first constructed in the 18$^{th}$ century. In 1910, the benefits of these cylindrical barns in America were documented in a Kansas State Board of Agriculture study, which noted that, "the rectangular form requires 22 percent more wall and foundation to enclose the same space; and that the cost of material is from 34 to 58 percent more for the rectangular building."

Round barns date back to late 18$^{th}$ century. The benefits of these curvilinear barns were well understood by progressive farmers and were the dominate shapes used to build new barns in the United States during the late 19$^{th}$ century. The benefits realized by building curvilinear barns included savings in materials, erection time, structural stability, and energy, as well as improved functionality. These benefits were well documented in a study from the Kansas State Board of Agriculture, Eighteenth Biennial Report, 1911-1912, pps. 139-142 on the efficiency of round barns where a farmer can "save from 30% to 40% of the cost of a rectangular barn by constructing a round barn of quite similar area." These structures utilizing the benefits of cylindrical walls and conical roofs were made primarily out of straight pieces of wood.

Curvilinear design for production scale has faced unresolved hurdles and remained an untapped opportunity. In the 1970s, Mr. Jason Purdy pioneered a construction method that combined air pressure and highly efficient insulation materials to form curvilinear building shapes. In these projects, an insulating/structural plasticized foam was sprayed onto an existing inflatable form or "balloon" to form the structure. The largest structure built by Mr. Purdy was a storage building five stories high and 110 feet in diameter, with no interior columns, for Holly Sugar Corporation. Other structures built by the Mr. Purdy included an aircraft hanger, offices and homes. This method of constructing curvilinear buildings is still utilized in the industry today. While overcoming some of the problems of inflexible, complex systems, this approach still requires skilled onsite labor, high transportation costs and expenses related to the need for a framework.

In describing the background of the invention, it is beneficial to briefly discuss certain prior art patents and their shortcomings. A first patent, U.S. Pat. No. 4,155,967, provides a method of lining a passageway with a hard, rigid pipe of thermosetting resin, wherein a tubular fibrous felt is immersed in the resin to form a carrier for the resin. The immersed felt and resin have an inflatable tube therein and this tube is inflated to shape the resin to the passageway surface. The resin is cured to form the hard, rigid lining pipe with the felt embedded therein. This invention starts with a flexible material with a felt lining impregnated with un-catalyzed plastic foam material, that can be installed (as a flexible liner) into an existing underground pipe and then catalyzed into a strong, smooth, hard pipe liner to repair existing broken or leaking pipes. The purpose of this invention is to rehabilitate existing underground pipes and avoid the disruption and expense of having to excavate the length of an underground pipe system for repairs. This serves only as an interior liner for underground pipes and is not used or intended as an independent, free standing, structural system.

A second patent, U.S. Pat. No. 3,277,219, provides a curvilinear building using an inflated form and on-site spraying of a plasticized foam material. This building system enjoyed the benefits of pre-manufactured inflatable forms that were light in weight and a lightweight plasticized foam material mixed/catalyzed and sprayed on-site onto the inflated form to produce a monolithic shell. The disadvantage of this system was that the foam materials had to be applied to the inflated form by specially skilled technicians, using highly specialized mixing and spraying equipment, and other specialized equipment (such as expensive and potentially dangerous temporary scaffolding equipment inside larger structures). This construction process was also vulnerable, during the extended period of time required by the on-site labor, to the uncertainties of weather (wind, rain, temperature fluctuations) before the building could be hardened into a free standing structure.

Another system to construct basically curvilinear structures using inflatable forms and on-site spraying of plasticized foam onto an inflated membrane is disclosed in U.S. Pat. No. 3,277,219. This patent teaches a building formed by an inflatable form and insulation layers of urethane foam are applied to the undersurface of the form. Hanger members are secured to the foam layer by adhesively affixing planar base portions of the hangers to the foam layer where after additional foam is applied to embed the hanger bases. Reinforcing mesh is secured to and supported by the hangers followed by the application of one or more layers of a cementitious material, which is allowed to cure. Air pressure beneath the form is progressively increased to maintain a substantially constant uplift force on the foam. The inflatable form may be removed after curing and a protective coating applied to the outer exposed surface of urethane foam to protect it from ultraviolet degradation. This invention shares the same disadvantages of on-site application of plasticized foam, as delineated above in the process of U.S. Pat. No. 3,277,219.

A fourth patent, U.S. Pat. No. 3,197,927, provides a tubular and structural frame and panel building system used to construct curvilinear structures from pre-manufactured parts and referred to as the geodesic dome. Unfortunately, this invention requires expensive tooling to manufacture the original parts, requiring bulky transportation of the rigid and heavy components, requiring time consuming and specialized on site labor and equipment to assemble the house, and requiring expensive retooling to manufacture each change in dimension. Another disadvantage of this building system was that it was made of multiple rigid parts that had to be sealed on site, where the assembled parts had joints that often faced the sky and remained vulnerable to leaking from rain and snow or expansion and contraction caused by changes in temperature.

It is also known that factory built modular homes/buildings provide a process of building a finished home by dividing a building into rectangular modules that are approximately 12'×12' and up to 60' long (a size contingent on legal trucking limits of roads and bridges), then at the site, lifting the modules onto a foundation with a crane and combining the modules on-site into a completed building. The advantage of this system is that approximately 80% of the construction occurs indoors, on a more efficient assembly line for parts and labor and the assembly time of a structure is reduced to 10% of the time required to build a stick-built house. The disadvantage is that the sizes and proportions are limited to the dimensions required by transporting the modules down a highway, dimensions that are unrelated to the qualities or functions of a building. Also, the modules of this building system suffer from an extremely wasteful and inefficient package for transportation in which over ninety percent of the package (module) being trucked to a site is not product, but air or empty space. Another variant of this building system is mobile homes, a building segment comprising over fifteen percent of new homes built in the U.S. This is a building system where the trailer and wheels transporting the building from the factory to the site is left in place to serve as the foundation of the building to take the place of a more permanent concrete foundation. Mobile homes suffer the same disadvantages as listed above for factory built modular homes/buildings. It is noted that manufactured homes made up twelve percent of the new home construction in the United States in 2008.

Thus, a heretofore unaddressed need exists in the industry to address the aforementioned deficiencies and inadequacies.

SUMMARY OF THE INVENTION

The present invention provides a system and method for primarily erecting curvilinear buildings using a plurality of interconnected structural tubes/sandwich panels. Both structural tubings and sandwich panels are utilized for curvilinear buildings. Referring first to the structure of structural tubing, structural tubing contains a flexible outer membrane, wherein the membrane contains an outer surface and an inner surface, and a lining connected to the inner surface of the membrane, wherein the lining contains a curable material that has formed into a solid foam material.

A method for fabricating a structural tubing is also provided, containing the steps of: connecting a fibrous and flexible lining to an inner surface of a flexible outer membrane, wherein the lining is saturated in a curable material that forms into a solid foam material when cured; and curing the curable material, thereby forming a solid foam material layer within the structural tubing having an air gap therein.

Referring to the structure of a sandwich panel, a sandwich panel contains a first flexible outer membrane, wherein the first membrane contains a first membrane outer surface and a first membrane inner surface. The panel also contains a first lining connected to the first membrane inner surface, wherein the first lining contains a curable material that has formed into a first solid foam material, a second flexible outer membrane, wherein the second membrane contains a second membrane outer surface and a second membrane inner surface, and a second lining, wherein the second lining is connected to the second membrane inner surface, and wherein the second lining contains a curable material that has formed into a second solid foam material.

A method for creating a sandwich panel is also provided, comprising the steps of: connecting a first fibrous and flexible lining to an inner surface of a first flexible outer membrane, wherein the first lining is saturated in a curable material that forms into a solid foam when cured; connecting a second fibrous and flexible lining to an inner surface of a second flexible outer membrane, wherein the second lining is saturated in a curable material that forms into a solid foam when cured; and curing the curable material of the first lining and the curable material of the second lining.

Other systems, methods, and features of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEW OF THE DRAWING

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A-2L provide examples of structural tubings.

Figure 3A:
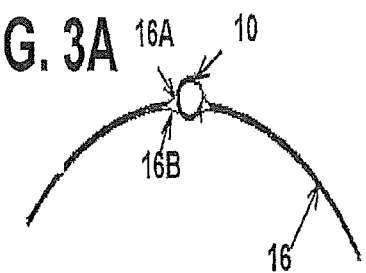
Figure 3B:
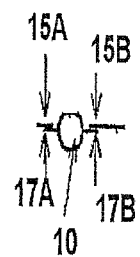
Figure 3C:
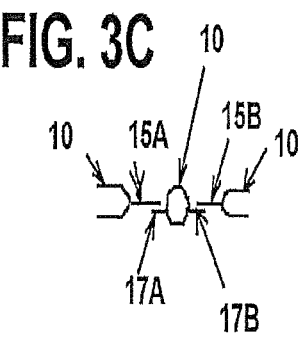

FIGS. 3A-3C provide examples of methods that may be used to connect tubings to extra membranes or other tubings.

FIGS. 4A-4D provide examples of tubings connected together with extra membranes and/or additional tubings.

Figure 5:
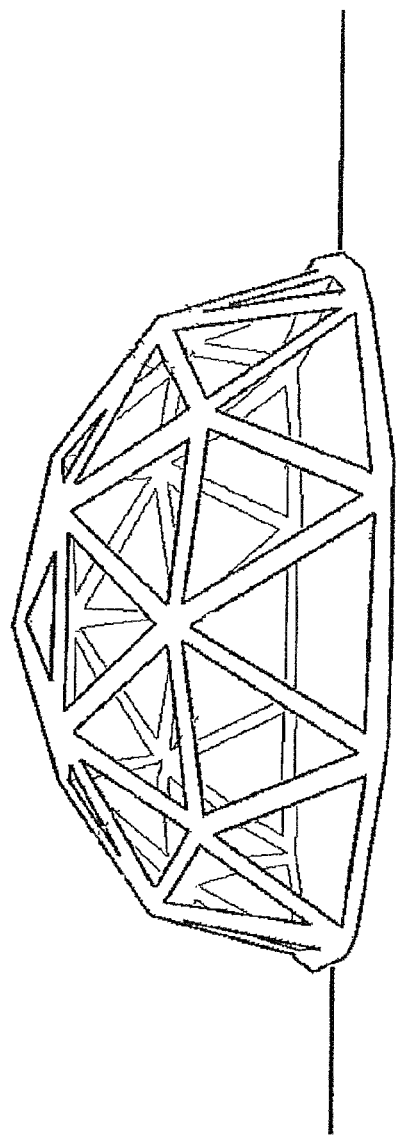

FIG. 5 provides an example of structural tubing as a frame structure.

Figure 6A:
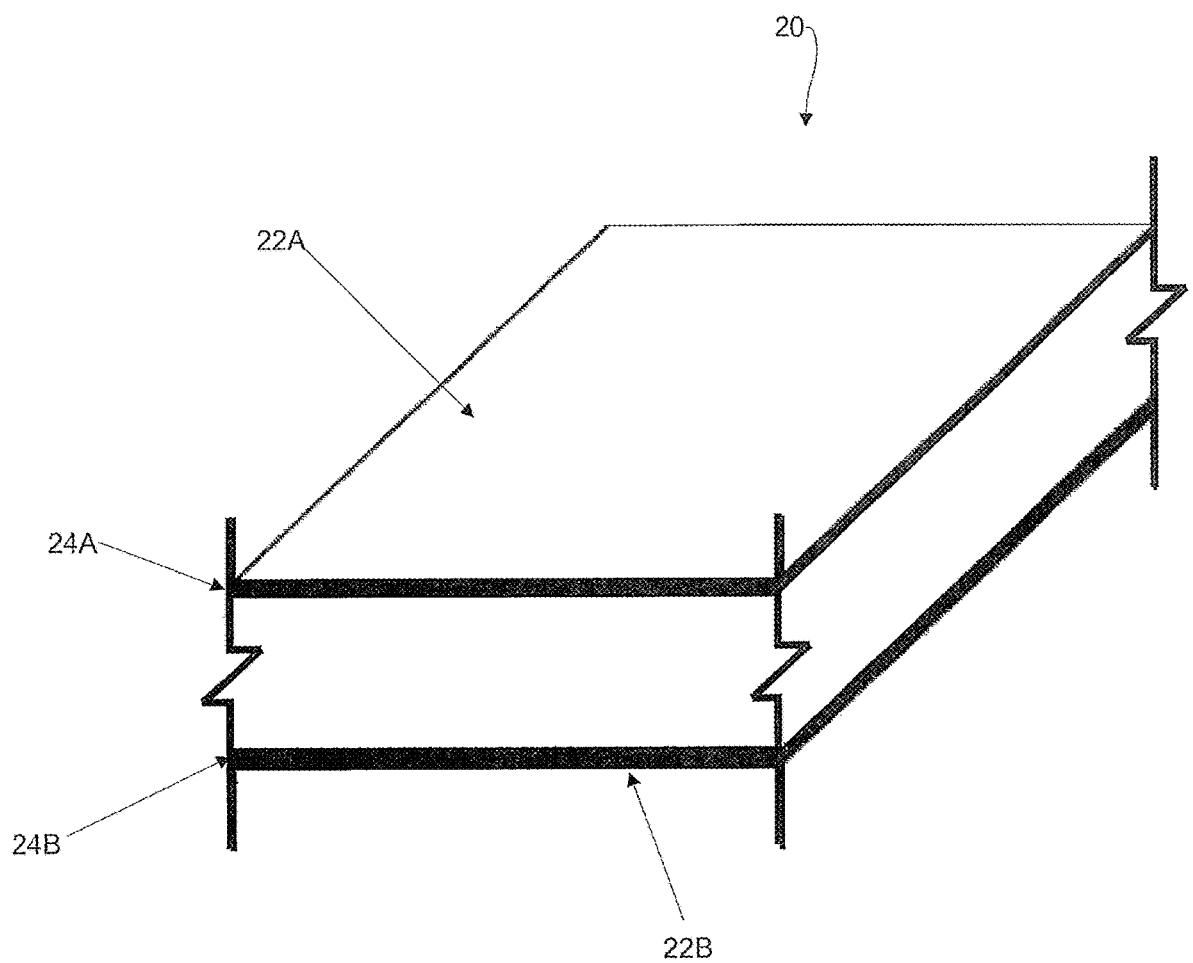

FIG. 6A is a schematic diagram providing a cross-section of a sandwich panel created in accordance with the first exemplary embodiment of the invention.

Figure 6B:
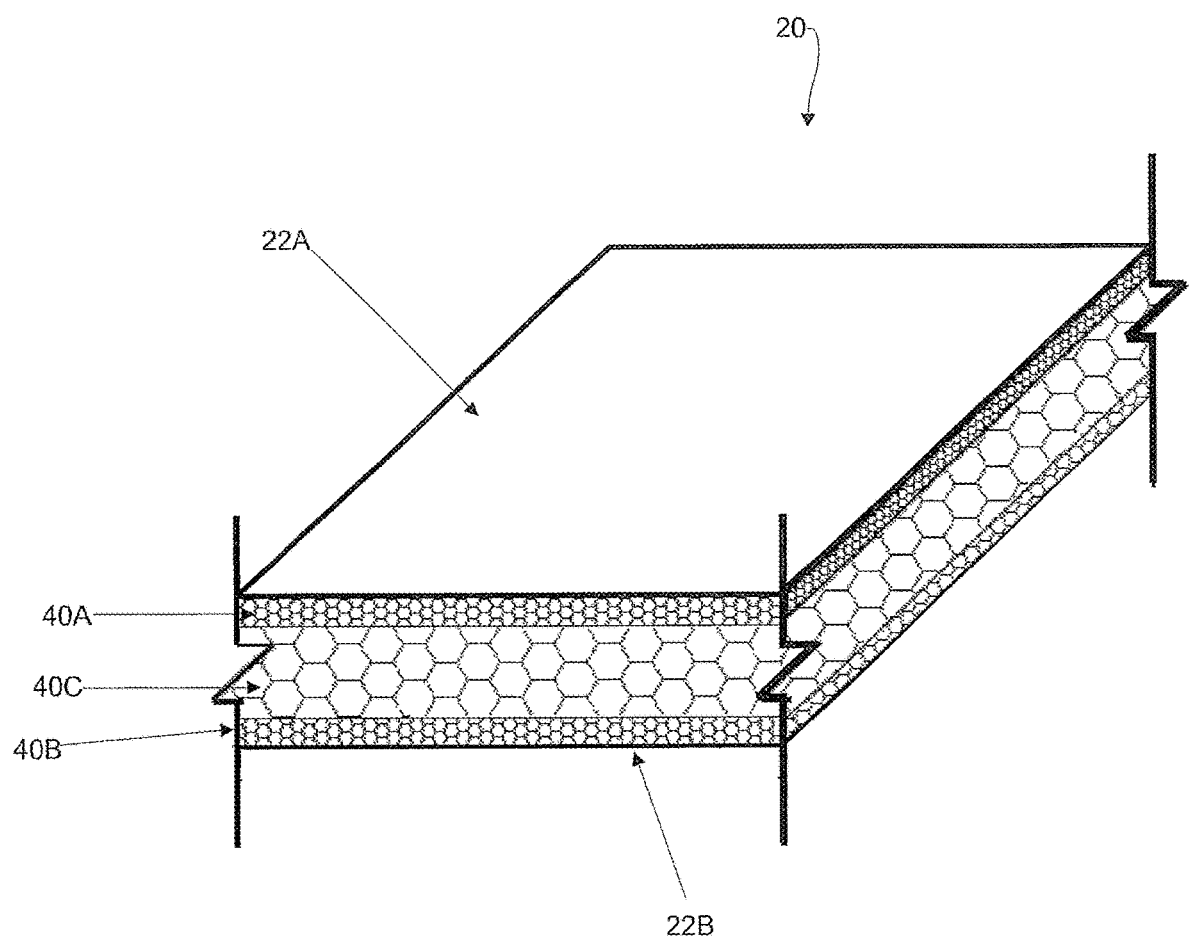

FIG. 6B is a schematic diagram providing a cross-section of a sandwich panel after curing created in accordance with the first exemplary embodiment of the invention.

Figure 7A:
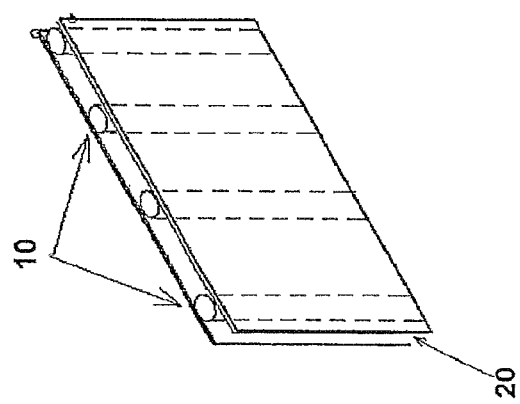
Figure 7B:
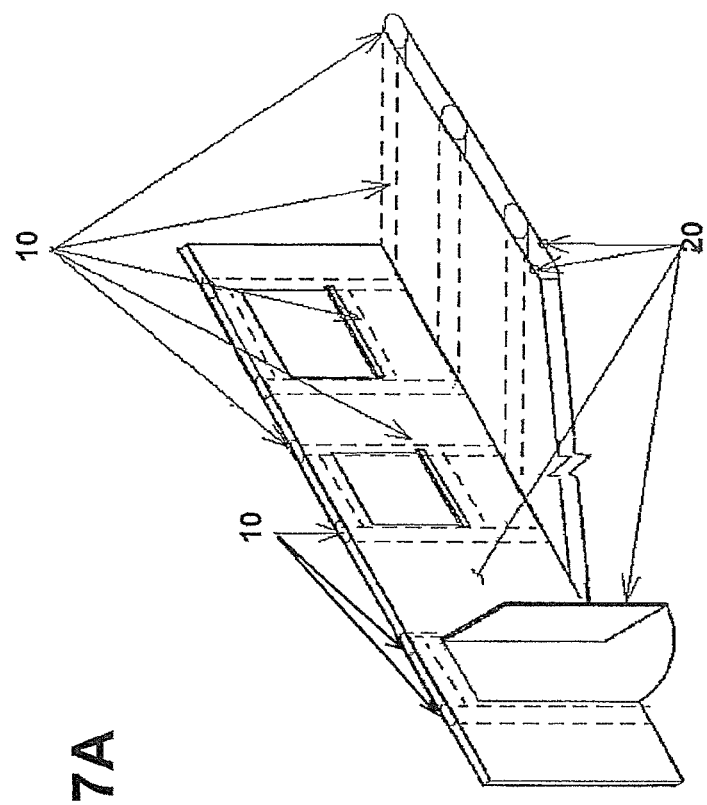

FIGS. 7A and 7B are schematic diagrams providing examples of panels that can span the area between structural tubings, thereby illustrating arrangements of tubings and sandwich panels in walls and floorings.

FIG. 8A is a schematic diagram providing a cross-section of a structural tubing construction that may have a single inflating source.

FIGS. 8B and 8C are schematic diagrams providing cross-sections of structural tubing construction that may not have a single inflating source.

FIGS. 8D and 8E are schematic diagrams providing cross-sections of structural tubing construction that may be connected to separate membranes.

Figure 9:
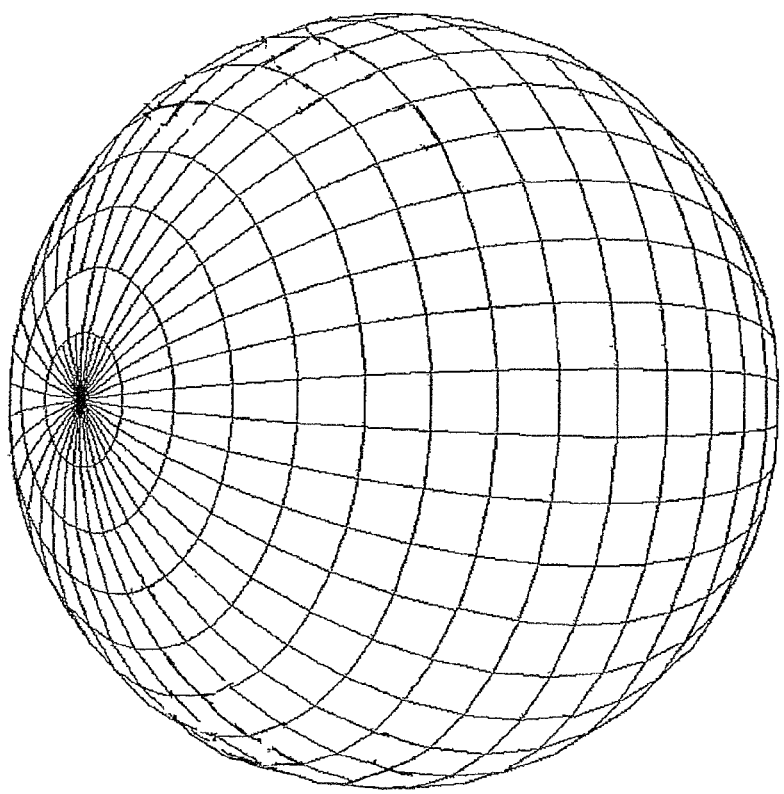

FIG. 9 provides an example of a sphere created by use of the present system and method.

Figure 10:
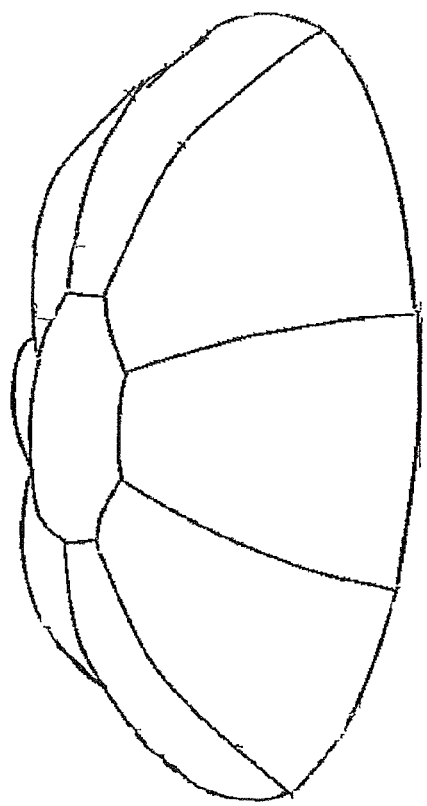

FIG. 10 provides an example of a dome, or gore configuration, that may be created by use of the present system and method.

Figure 11:
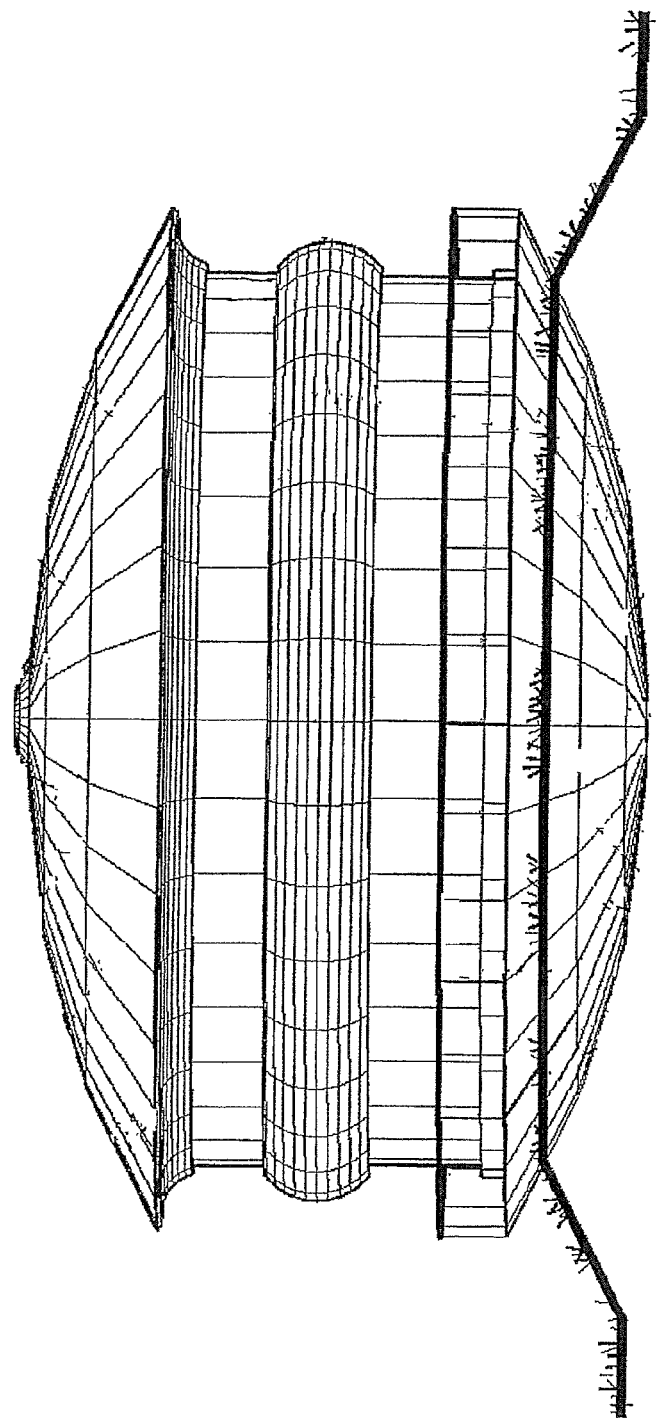

FIG. 11 provides an example of a building that may be constructed by use of the present system and method.

Figure 12:
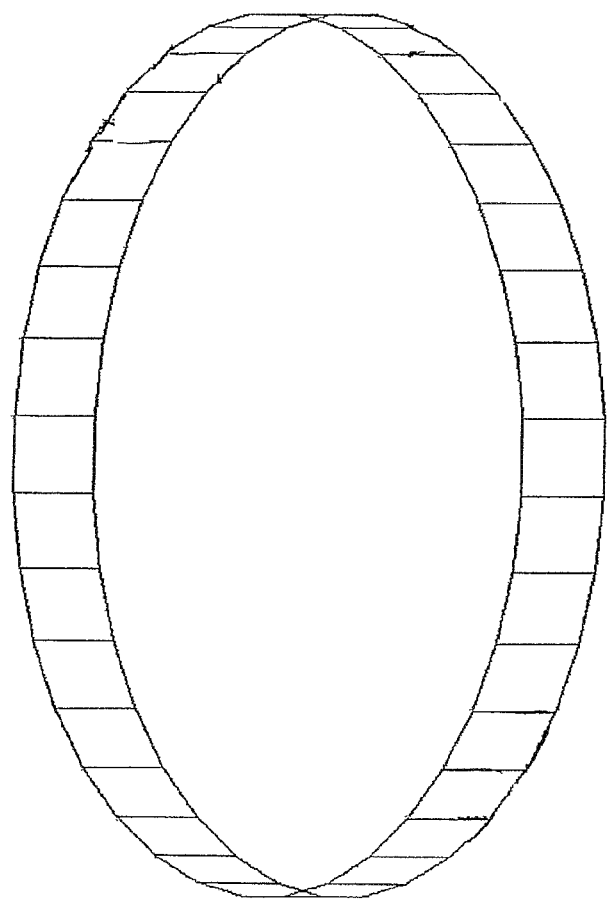

FIG. 12 provides an example of structural tubing and panel arrangement in a cylindrical (singly curved) building and an arch structure.

Figure 13:
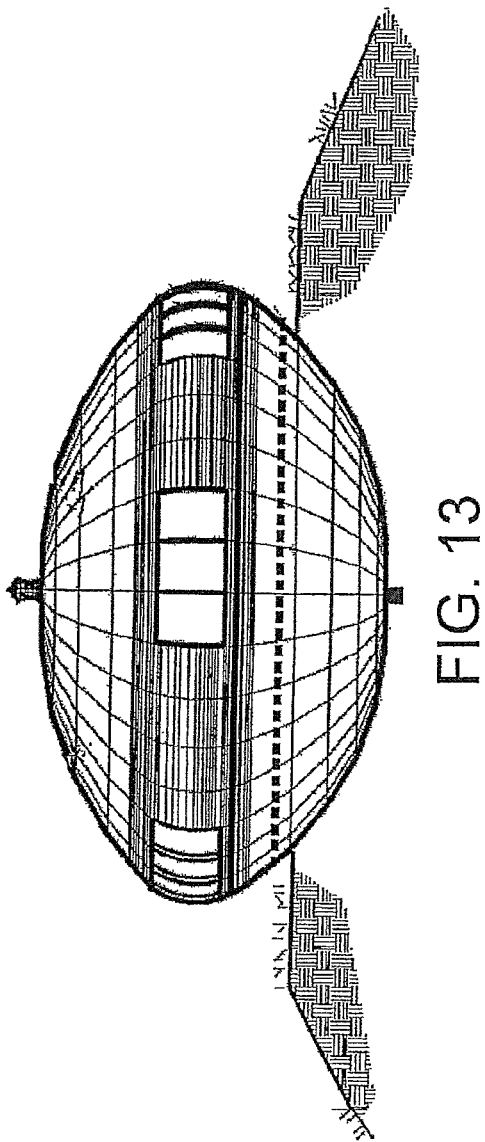

FIG. 13 provides and example of a curvilinear building having a curvilinear base that may be constructed by use of the present system and method.

DETAILED DESCRIPTION OF THE INVENTION

Prior to explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The present system and method provides a superior method for building buildings and other structures. The system and method relates to a construction system primarily for erecting curvilinear structures, which includes structural tubing and panels spanning between tubing. It should be noted that the terms tubing and sandwich panels herein may be used interchangeably because the design principles described herein are the same and differing only in size and shape.

Use of the structural tubes and panels can form continuous shell structures that can be placed on the ground without a separate foundation. The shell structure eliminates the high point loads of conventional structures and minimizes the pounds per square inch (psi) structural loads by spreading the weight of the building over a wider area and allowing for placement in a much wider variety of soils. Also the high strength-to-weight ratio of the building allows for lighter structures than building systems currently available. This lighter weight further reduces the requirement for a foundation structure that is separate from the building shell.

The building method creates new benefits and overcomes the disadvantages of other building systems due to numerous reasons. As an example, the form of a building created by using the present system and method is shaped by a flexible inexpensive material that can be easily designed by a Computer Aided Design (CAD) program, or other software program, and can be constructed through a computer driven mechanical process. Changes in shapes and dimensions can be quickly and easily achieved with minimal or no expense. In addition, the building form is light-weight, very compact, foldable and easily transportable. The un-catalyzed plasticized foam material utilized in the present method, which is in the form of the building, can later be catalyzed on site and expands to a depth that is larger than the depth of the original plasticized foam material (as an example, up to 30 times the depth). Of course, expansion to other depths is also provided. The building can also be erected (formed into its final shape) by inflating with, for example, a common electric fan and/or be hung from a frame by gravity and/or be wrapped around a form, and then catalyzed and made into a finished free-standing, structurally sound, durable structure. This process is quick and uses a minimum of onsite labor.

The present system and method can be understood as similar to blowing soap bubbles, where applying air pressure to a liquid blown through a wire frame spanned with a soapy film creates spherical forms. Due to its curvilinear form, the delicate "skin" of soap bubbles can be quickly formed into various sizes and combinations, last for minutes, and withstand light air currents. Bubbles are, in fact, curvilinear forms with remarkable structural integrity, and demonstrate nature's way to form the most efficient enclosure of space on earth.

The present method uses this natural "bubble logic" in conjunction with a plasticized foam material to produce a "skin" that does not require interior scaffolding and is highly insulating, structurally sound, and permanent. Inflated into a form that is then made rigid with catalytic agents, (e.g., steam, sunlight, hot air), the plasticized foam product can be easily and quickly formed on-site (within minutes or hours) to create walls, roofs, foundations or floors that are multiple times the volume of the original material (for example, thirty times the volume).

This method of producing primarily curvilinear structures can dramatically reduce the number of pieces required for construction, the transportation costs, and the labor. Moreover, it combines the energy-saving and cost-saving benefits of both the material technology and the curvilinear form for a superior alternative to existing construction.

The method described herein offers many advantages, such as, but not limited to, maximizing material efficiency from the components both individually and collectively from the form (i.e., maximizing volume with a minimum of surface area), maximizing structural strength from the forms (i.e., curves and double curved surfaces), maximizing structural strength by varying the densities (rigid to soft) of plasticized foam materials within the tubing or sandwich panels, significantly reducing the number of components, simplifying the construction process; reduces the variety of materials, simplifying the construction process; reducing erection labor costs, decreasing the erection time with the associated savings resulting in a shorter construction period (i.e., less construction interest, quicker occupancy, additional rental income, additional owner operating revenue, more building built for a professional builder in a given period, etc.), reducing energy costs due to the insulating value of construction materials used (materials can serve both a structural purpose and insulating purpose simultaneously), significantly reducing the weight of materials to reduce transportation cost; resulting in an extremely compact "pre-construction" building package to reduce transportation costs to the construction site, and it is a practical method for constructing curvilinear structures at a significantly reduced expense overall.

The design principles driving this construction method primarily for curvilinear structures is similar to the criteria used in designing and building high performance aircraft, in that both rigorously pursue design principles which efficiently respond to the forces of nature (gravity, wind, and water). Additionally, the structures resulting from this method of construction are more cost effective in accommodating the requirements of controlled climates for human comfort or for storage of materials and/or products.

The invention described herein represents an entirely novel construction method conceived to exploit the properties of structural integrity inherent in curvilinear form, utilizing current material technology to accomplish this. This method will allow for innovative design options, substantial energy and costs savings (across the spectrum from transportation to building operation), and efficient full-scale production that is not currently feasible.

Turning now descriptively to the drawings, in which similar reference characters denote similar elements throughout the several views, the figures illustrate different embodiments of circular structural tubing and sandwich panels located between certain embodiments of the tubing.

Figure 1A:
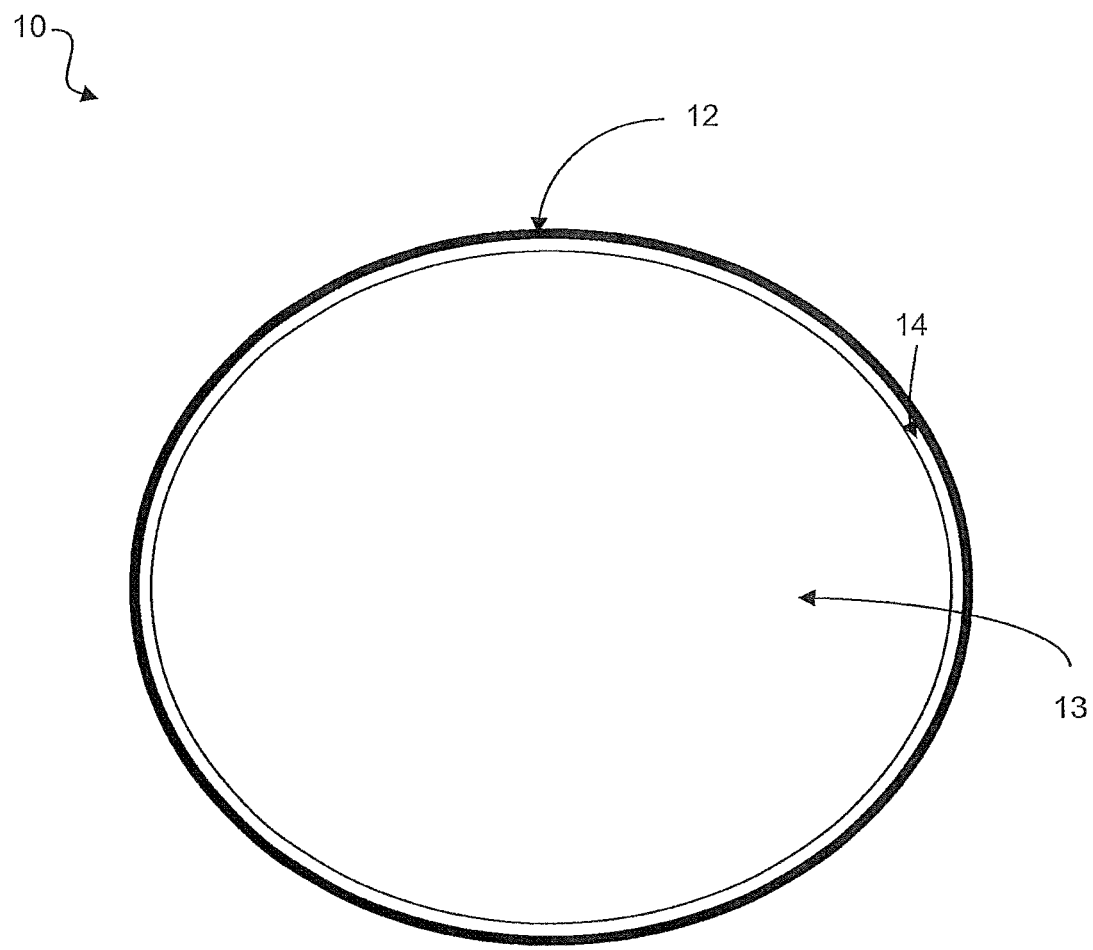
FIG. 1A is a schematic diagram providing a cross-section of circular structural tubing before curing created in accordance with a first exemplary embodiment of the invention.

FIG. 1A is a schematic diagram providing a cross-section of circular structural tubing 10 created in accordance with a first exemplary embodiment of the invention. As shown by FIG. 1A, in accordance with the first exemplary embodiment of the invention, the tubing 10 contains an outer layer 12, which is a flexible outer skin, or membrane that can be shaped in a circular or curved shape. The membrane 12 may be selected from any flexible material depending on the characteristic of the tube desired. In fact, the important characteristic of the membrane 12 is that the membrane 12 is flexible.

Figure 1B:
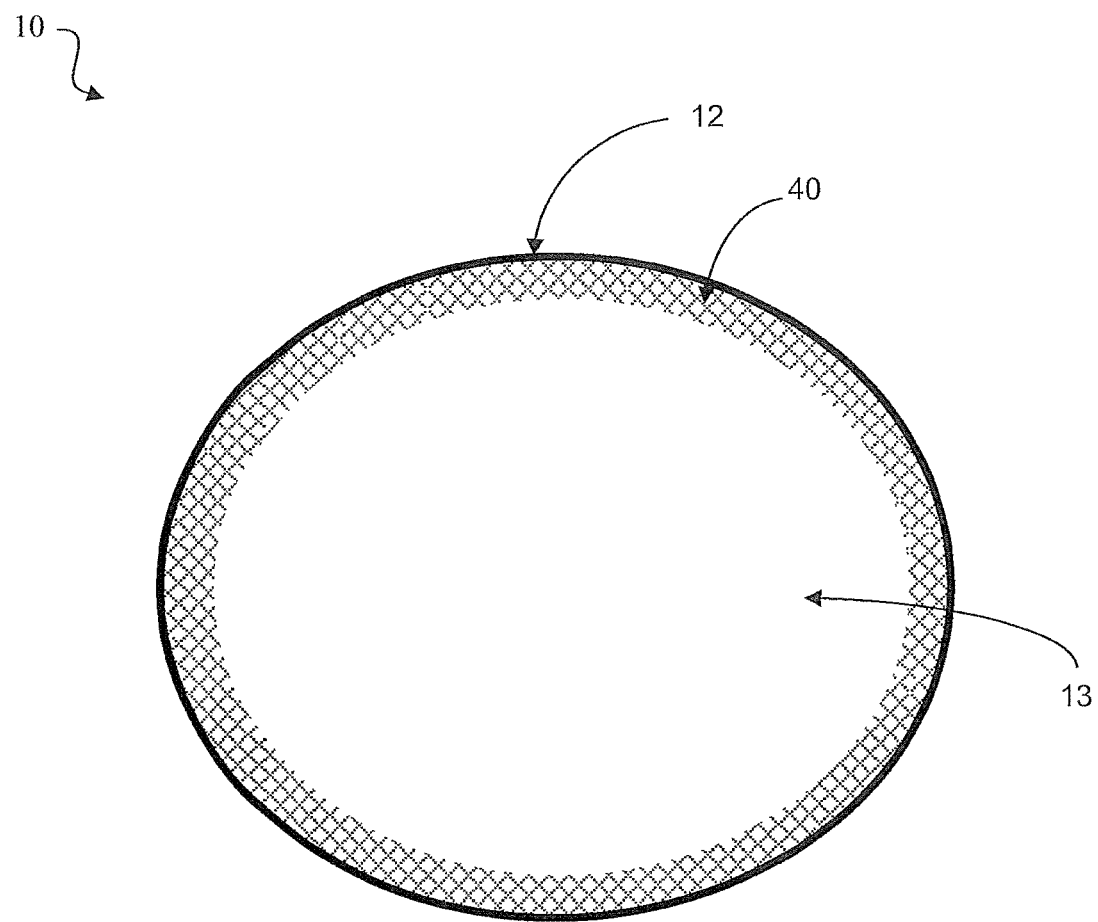
FIG. 1B is a schematic diagram providing a cross-section of circular structural tubing after curing created in accordance with a first exemplary embodiment of the invention.

A lining 14 (FIG. 1A), having unexpanded foam material saturated therein, is pressed, attached, or bonded to an underside of the membrane 12. It is noted that FIG. 1B illustrates the tubing 10 having the foam material 40 expanded. The lining 14 (FIG. 1A) is preferably a fibrous and flexible felt material or a different material that is capable of being saturated in resin. It should be noted that instead of resin, a different material may be used to saturate the lining 14 (FIG. 1A), where the material is still capable of expanding during/after being cured so as to form a solid foam material, such as, but not limited to, a plastic foam material. It should be noted that foam material may have different characteristics depending upon the use for the material. For example, the foam material may be extremely dense or less dense based on the intended use. The foam may also have different tensile strength and compressive strength.

The lining 14 (FIG. 1A) may be pressed, attached, or bonded to the membrane 12 by using one or more of many different techniques, such as, but not limited to, glue, heat sealing, air pressure, Velcro, double face tape, chemical bonding, mechanical bonding, and other techniques. After curing of the unexpanded foam material air gap 13 may result as illustrated the cross-sectioned structural tubing 10 of FIG. 1B. It should be noted that it is not necessary that an air gap be located within the tubing. Alternatively, there may be no air gap, but instead, the foam material 40 may fill the entire area within the membrane 12.

As previously mentioned, the structural tubing 10 contains a circular or curved membrane 12. The membrane 12 starts as a flexible, foldable tube that contains the lining 14 of unexpanded plastic foam material adhered thereto. In construction, the structural tubing 10 can be brought to a construction site in a compact package having the membrane 12 with lining 14 adhered thereto, then inflated or formed. The lining 14 in the walls of the tubing 10 can then be caused to expand by a catalyst to harden the resin into a structural member or strut in a curvilinear building enclosure or in other building components.

FIGS. 2A-2L are examples of structural tubings 10. FIG. 2A provides an example of a tubing 10 that is shaped as an eye with an extra membrane 16 located to the left and right ends of the tubing 10. It should also be noted that the tubing may instead have different shapes, such as, but not limited to, a rectangle, an example of which is shown by FIG. 2B, an oval, an example of which is shown by FIG. 2C, and a circle, an example of which is shown by FIG. 2D.

Multiple tubings 10 of different shapes may also be connected together. As an example, FIG. 2E provides an example of tubings 10 connected together with an extra membrane 16 connecting the tubings 10. FIG. 2F provides an example of tubings 10 connected together by ends of the tubings 10. FIG. 2G. provides an example of tubings 10 with flat ends that are connected by their ends. FIG. 2H provides the tubings 10 of FIG. 2G, however, with an extra tubing 18 located on a top of the connection between two adjacent tubings 10. FIG. 2I provides an example of tubings 10 located within a first membrane 12A and a second membrane 12B. FIG. 2J provides an example of tubings 10 aligned in the same manner as that of FIG. 2G, but with a first membrane 12A and a second membrane 12B located above and below the tubings 10, respectively. It is noted that a first air gap 13A is located between the top of the tubings 10 and the first membrane 12A, while a second air gap 13B is located between the bottom of the tubings 10 and the second membrane 12B. FIG. 2K provides the structure of the tubings of FIG. 2J, however, with expanded plastic foam located within the first air gap 13A. FIG. 2L provides the structure of the tubings of FIG. 2J, however, with expanded plastic foam located within the first air gap 13A and the second air gap 13B.

FIGS. 3A-3C provide examples of methods that may be used to connect tubings 10 to extra membranes 16 or other tubings 10. As shown by FIG. 3A, one method of connecting tubings 10 to extra membranes 16 is to have the tubing 10 located between a first layer 16A and second layer 16b of the extra membrane 16. FIG. 3B instead illustrates the process of adhering a first extra membrane 15A to a first tubing extra membrane 17A and a second extra membrane 15B to a second tubing extra membrane 17B. FIG. 3C is similar to FIG. 3B, except the first extra membrane 15A and the second extra membrane 15B are is connected to additional tubings 10.

Figures 4A, 4B, 4C, 4D:
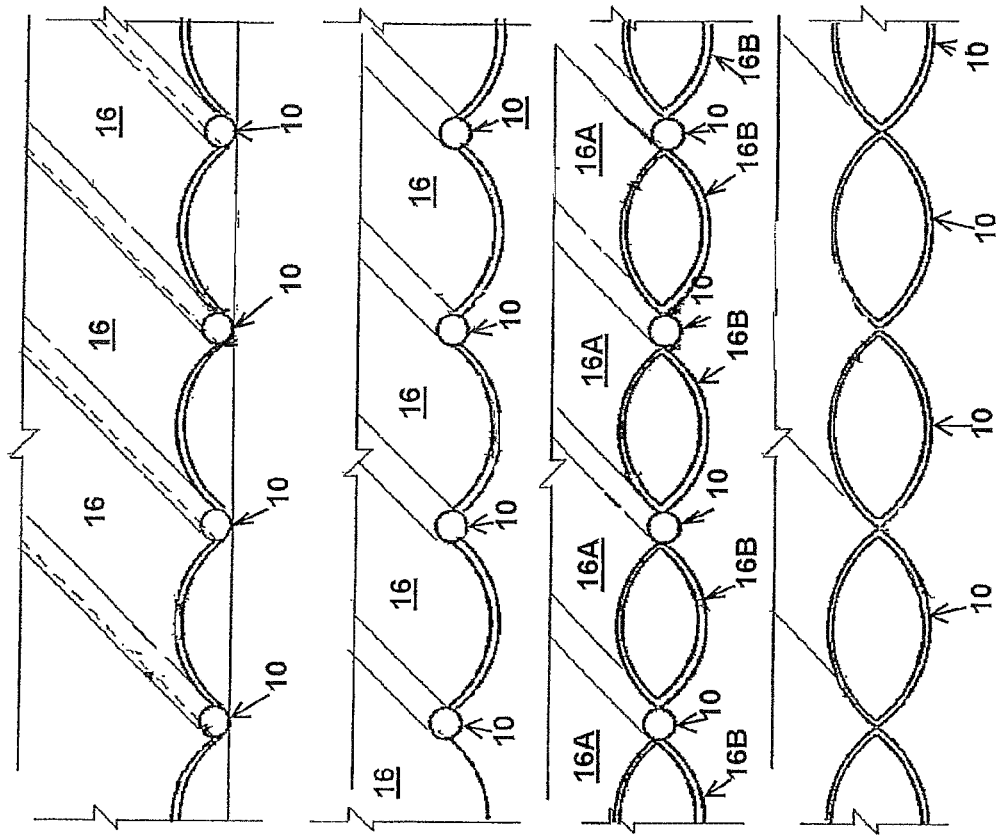

FIGS. 4A-4D provide examples of tubings 10 connected together with extra membranes 16 and/or additional tubings 10. Specifically, FIG. 4A and FIG. 4B provide examples of tubings 10 connected together with extra membranes 16. It should be noted that the extra membranes may instead be lining that may or may not contain a curable material. In additional, FIG. 4C provides an example of tubings 10 connected together by an upper extra membrane 16A and a lower extra membrane 16B. FIG. 4D provides an example of tubings 10 in the shape of an eye that are connected together by their respective ends.

The structural tubings 10 may form a plurality of interconnected elements in various depths, diameters, widths, and configurations for maximizing structural strength and stability for a curvilinear building or flat building components. Configurations of the interconnected tubing configurations would be of different types for roof and wall such as: spheres, toruses, geodesics, spherical segments, hemispheres, oblate ellipsoids, arches, belly bands, meridian members, rectangles, squares, longitudinal members, hyperbolic parabaloids, parabolas, ellipses, cylinders, pentagons and other figurations in primarily curvilinear structures. The structural tubing 10 also may serve as structural members in walls, roofs, foundations and floors in a flat horizontal or vertical configuration for use in curved or straight components of a building.

As mentioned above, the structural tubings 10 can be joined together in various ways including, for example, coupling the structural tubings 10 at the joints all in the same plane, the tubing can pass over or under one another at the intersections, or the structural tubings 10 can be woven over or under each other at the intersections. An example of structural tubing as a frame structure is provided by FIG. 5. It should be noted that the structural tubing of FIG. 5 is interconnected so that a single inflation source may be used and connected to a single structural tubing 10 for curing of all structural tubings 10 at once. A cross-section of such a structural tubing 10 construction that may have a single inflation source is illustrated by FIG. 8A, where an opening 30 in one tubing 10 represents a second tubing extending out ninety degress from the first tubing.

Alternatively, the structural tubings of FIG. 5 may be interconnected, yet not be capable of receiving a single inflation source for curing of all structural tubings at once. A cross-section of such a structural tubing construction, where the structural tubings are not capable of receiving a single inflation source prior to curing of all tubings 10 at once is shown by FIGS. 8B and 8C. In accordance with an alternative embodiment of the invention, the structural tubings 10 in a structural tubing construction may be connected to separate membranes 12, examples of which are shown by FIGS. 8D and 8E.

It should be noted that structural tubing 10 can be combined with other materials to improve structural strength, durability or greater functionality. Other materials could include steel, high-density plastic foam, low-density plastic foam, cable, wood, and concrete.

FIGS. 6A and 6B are schematic diagrams providing cross-sections of a sandwich panel 20 created in accordance with a first exemplary embodiment of the invention. As shown by FIG. 6A, in accordance with the first exemplary embodiment of the invention, the sandwich panel 20 contains a first membrane 22A, which has the same characteristics as the membrane 12 of the tubing 10 except that the first membrane 22A is not circular or curved. In accordance with an alternative embodiment of the invention, the first membrane may instead be curved or circular.

A first lining 24A of unexpanded foam material, similar to the lining 14 of the tubing 10 is bonded to an underside of the first membrane 22A. The sandwich panel 20 also contains a second lining 24B of unexpanded foam material adhered to a second membrane 22B. It is noted that FIG. 6B illustrates a sandwich panel where the resin within the linings 24A, 24B (FIG. 6A) have expanded, resulting in the expanded foam material illustrated, namely, a top expanded foam section 40A, a bottom expanded foam section 40B, and a central expanded foam section 40C.

In accordance with the present invention, the different foam sections may be formed by different methods. As an example, the central expanded foam section 40C may be an extension of the top and bottom expanded foam sections 40A, 40B, which is created when the resin of the first and second linings 24A, 24B are cured. Alternatively, an extra lining saturated in resin may be located between the first and second resin saturated linings 24A, 24B, thereby creating the central expanded foam section 40C when cured. It should be noted that the different expanded foam sections may have the same or different densities and characteristics.

In accordance with a second exemplary embodiment of the invention, instead of having one or more membrane and one or more lining, the tubing and sandwich panels may instead only be constructed of linings alone.

Continuing with the first exemplary embodiment of the invention, sandwich panels 20 are flexible, foldable panels that can be brought to a construction site in a compact package, then formed or inflated, and the resin within the lining 24A, 24B can be caused to expand by a catalyst to harden. In a curvilinear exterior building enclosure, exterior or interior walls, and other furniture elements inside the enclosure such as countertops, tables, shelves, cabinets, doors and floors, the sandwich panels 20 span primarily between the main structural tubings 10. The primary purpose of the panels 20 is to span between the structural tubings 10 to form complete enclosures of roofs, walls and floors. The panels 20 can also be used as a building component without the structural tubing 10. Alternatively, the panels 20 can also be used as insulation depending on the composition of the linings 24A, 24B. The panels 20 can also have hollow areas, or air gaps created in the center, which can serve as a chase for various building components such as wiring, cable, liquids, air, compressed gases.

It should be noted that the structural tubing 10 and sandwich panels 20 may contain additional membranes, linings, and expanded foam sections.

The sandwich panels 20 can be formed by gravity, inflated pneumatically or hydraulically or by expansive gases, or formed on a template then made rigid by a catalytic agent introduced into the plastic foam material (lining) thereby hardening the sandwich panel 20 to be made into the desired components of a building including, for example, walls, roofs, foundations, ceilings, floors, and furniture as well as bath and kitchen fixtures.

Sandwich panels 20 primarily span the area between the structural tubings 10 to form a continuous exterior enclosure, such as a wall or roof system, to keep out rain, wind, and snow and to potentially moderate the heating and cooling loads of a building. These panels 20 can also span the area between the structural tubings 10 in walls and floors, examples of which are illustrated by FIGS. 7A and 7B, where tubings 10 are located between sandwich panels 20. The panels 20 can also be formed into tables and countertops, bath and kitchen fixtures, bookshelves, and water tanks.

In summary, the tubes 10 and/or panels 20 can serve as the main structural components of a building. As previously mentioned, the structural tubings 10 and sandwich panels 20 will serve as the structural components of building walls, ceilings, and floors. The sandwich panels 20 are used to span and enclose the area between the structural tubings 20. The tubing 10/sandwich panel 20 can be joined to itself or together in various ways including, for example, but not limited to, glue, heat sealing, gravity, air pressure, Velcro, double face tape, chemical bonding, mechanical bonding, hooking, stapling, and straps. It is also noted that the skin of the tubes and the sandwich panels can be left in place as the final exterior finish.

While the tubings 10 and sandwich panels 20 are excellent for building main structural components of buildings, the structural tubings 10 and sandwich panels 20 can be used to form interior furniture and fixtures in a building including, for example, but not limited to, countertops, cabinets, tables, chairs, shelves, tanks for holding liquids, bath and kitchen fixtures (toilets, showers, sinks, bathtubs) and floors, and walls. The sandwich panels 20 do not have to be combined with the tubings 10 if the structural requirements of the building component do not need the tubings 10 for structural strength.

The purpose of the present construction system and method is to erect curvilinear buildings using structural tubing 10 and sandwich panels 20. The building system is unique in that it can produce curvilinear buildings that are lightweight, have high strength-to-weight ratio and minimum surface area to maximum volume, are easily transportable, offer compact packaging for transport, are quickly erected, are materially efficient, and provide savings in energy usage and other operating costs. This curvilinear structural enclosure system significantly reduces the number of construction components and the variety of building materials required over conventional structural systems. This structural enclosure system therefore subsequently results in a savings of costs and time required from start of construction to occupancy. Energy costs of a building are reduced because of the exceptional insulating qualities of the plastic foam materials in the structural tubes 10 and panels 20. Building operational efficiencies are achieved from the insulating qualities and the durability and structural strength of the materials used.

In addition to the above-mentioned, a reduction of outside air infiltration results from a tighter exterior skin that has fewer components and tighter fit because the primary components of the skin of the building start out as a liquid or liquid-like substance (i.e., resin), which is expanded to multiple times the thickness of the original component and turned into solid components primarily at the construction site. A wide variety of structural strengths and durability can be achieved by varying the density and/or layering of the plastic foam materials. A wide variety of insulating efficiencies can be obtained by varying the density of the plastic foam materials and/or layering of the plastic foam material.

While there are countless examples of curvilinear structures that may be constructed using the present system and method, FIG. 9 provides an example of a sphere created by use of the present system and method, FIG. 10 provides an example of a dome created by use of the present system and method, and FIG. 11 provides an example of a building that may be constructed by use of the present system and method. In addition, FIG. 12 provides an example of structural tubing and panel arrangement in a cylindrical (singly curved) building and an arch structure.

It should be noted that use of the present system and method may eliminate the need for a separate foundation system. Specifically, the system and method is suited for thermal mass materials (water, etc.) in a lower portion of a curvilinear base 40 to produce the heating/cooling benefits of a thermal flywheel. An example of such a building having such a curvilinear base 40 is shown by FIG. 13.

It should be noted that the tubing or panels of the present invention can be individually or collectively inflated, pneumatically, hydrologically, or by a different method, and then hardened into structural building components. In fact, the tubing or panels can be individually or collectively inflated with such methods, whereby the tubing can serve as a temporary framework for the sandwich panels of the present invention (in multiple sections joined together or as a monolithic, one-piece shell structure sandwich panel) to be placed and hardened, after which the temporary tubing can be removed and the completed structure can stand independent of the temporary erecting tubing. For additional structural purposes, cables and other materials can be added inside the tubing to increase the structural strength of the building components. The tubing in the temporary framework can also be used as a permanent framework for the addition of an outer skin having no plasticized foam lining, such as a vinyl or rubber sheathing skin.

A wide variety of densities and insulating properties available in the plasticized foam material provided in the present method allows for an almost unlimited range of structural capabilities, reduced structural weight and insulation properties. Plasticized foam material allows for a wide structural vocabulary. Large volumes and long spans can be economically achieved by curved shapes, monolithic shells and sandwich panels all with nearly limitless structural capabilities made possible by layering the densities of the plasticized foam material. In addition, various flexible liners can be utilized for the first and second membrane(s) of the sandwich panel used in the present method. Flexible membranes can be added for weather-proofing, fire proofing, pest protection, durability, light weight, and for energy generation such as thin film solar collectors for electricity and flexible containers for water heating.

Due to the present method starting with a flexible material impregnated with an expandable resin-like substance, it can be formed into almost any shape from flat to curved. This capability allows the present method to also form almost every interior component in a building including walls, floors, window and door frames, doors, tables, sinks, toilets, pipes, furniture, conduits, tanks and foundations.

It should also be noted that the hardened tubes described above can serve as a structural framework to hold up a membrane material to which a plastic foam material is applied to the surface to stiffen and/or insulate the membrane. In addition, the hardened tubes can serve as a structural framework to hold up a flexible skin to form a tent-like enclosure. Further, the tubes can provide a variety of structural capabilities increasing the depth or width of the tubing or panels and where the structural strength can be changed by also varying the composition of the plastic foam lining of the tubes.

For additional structural purposes, cables, rods, or other materials can be added inside the tubing to increase the structural strengths of the building components. Still further, the tubes may be embedded or attached to the outer membrane of the structure, then inflated or erected on site where the embedded tubes are made rigid, allowing the structure to stand on its own. In addition, the outer membrane of both the tubing and the sandwich panels can incorporate the use of netting (wire, fabric, rope, etc.) to assist in the structural stability of the structure either on a temporary or permanent basis.

The interconnected structural tubes and sandwich panels can form flexible precatalyzed tubes and panels that can be attached to one pre-hardened panel or inserted between two pre-hardened panels or shaped by a pre-configured form or hung to produce building components including walls, floors, windows and door frames, tables, counters, toilets, sinks, and other structures.

The present system and method provides for the formation of shapes that are better suited for shell structures that allow for cost effective clear-spanning of column free interiors. Column-free interiors allow for greater flexibility in interior space planning and materials storage. In addition, the present system and method provides tubes and sandwich panels that can enclose space with a high strength-to-weight ratio, can serve as a lightweight, rigidizing shell or frame for blimps, zeppelins, or other structures, and can provide compact packaging for structures to be transported to remote, inaccessible areas or outer space.

In accordance with an alternative embodiment of the invention, the flexible outer skin or membrane that forms the walls of the tubing or panels can also be comprised of a flexible, thin film solar device including flexible thin solar skin/membrane, solar panels, and solar hot water devices that can generate some or all of the energy requirements of a building. In addition, the flexible, thin film solar device can be attached to the surface of the panels or tubes.

It should be noted that the present system and method may be used to produce roofs, walls, foundations and floors that can reduce the costs of constructing buildings over methods and materials currently available. In addition, the present system and method extends to the construction of interior partitions, doors, countertops, baths, showers, sinks, toilets, chairs, doors, door and window frames, railings, conduits for electrically and energy distribution, and other elements. The tubes and panels can also be unpacked on site and inflated pneumatically or hydraulically to form and shape the principle structural members of the walls and/or roof.

The plurality of interconnected structural tubes and sandwich panels can be formed into structures more amenable to creating "autonomous buildings", which are buildings that can be operated independently from infrastructure support such as the electric power grid, or municipal utilities such as water and sewer. An example of this category of building includes buildings in a circular shape that have direct sun all day as the sun travels around the building, maximizing solar energy benefits or buildings with a spherical base filled with a medium such as water that can moderate temperature similar to the thermal fly wheel effect enjoyed by sites close to an ocean shoreline.

It is also noted that the present tubing and sandwich panels allow an enclosure to fit the angle of repose of piled commodities (salt, sand, sugar beets, potatoes, etc.) thus eliminating the side wall pressure of verticle walls. This allows buildings to use less material because the building can be formed to fit the angle of repose of the piled commodity.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A free standing curvilinear structure comprising:
   at least one structural tubing;
   wherein the tubing comprises a lining comprising a lining material;
   wherein the lining is pre-manufactured as being saturated with the lining material and as being substantially flexible before inflation and curing of the lining material; and
   wherein after inflation and curing of the lining material, the lining comprises a solid foam material having a shape.

2. The structure of claim 1, wherein at least two structural tubings are interconnected.

3. The structure of claim 2, wherein at least one of the at least two structural tubings is configured to be inflated by a means for inflating the structural tubing.

4. The structure of claim 1, wherein the lining comprises a fibrous material.

5. The structure of claim 1, wherein a central air gap is located within the structural tubing.

6. The structure of claim 1, wherein the lining material comprises an expandable, curable resin.

7. The structure of claim 1, wherein the lining comprises a catalytic agent configured to catalyze curing of the lining material.

8. A free standing curvilinear structure comprising:
   at least one sandwich panel;
   wherein the sandwich panel comprises a first lining comprising a first lining material;
   wherein the sandwich panel comprises a second lining comprising a second lining material;
   wherein the first lining is pre-manufactured as being saturated with the first lining material and as being substantially flexible before inflation and curing of the first lining material;
   wherein the second lining is pre-manufactured as being saturated with the second lining material and as being substantially flexible before inflation and curing of the second lining material; and
   wherein after inflation and curing of the first and the second lining materials, the first lining comprises a solid first foam material having a first shape and the second lining comprises a solid second foam material having a second shape.

9. The structure of claim 8, wherein a plurality of the multiple sandwich panels are interconnected.

10. The structure of claim 9, wherein at least one sandwich panels is configured to be inflated by a means for inflating the sandwich panel.

11. The structure of claim 1, wherein the lining comprises a fibrous material.

12. The structure of claim 8, wherein the first and the second solid foam material meet in at least one area.

13. The structure of claim 8, wherein the first and the second solid foam material have an air gap there between.

14. The structure of claim 8, wherein at least one of the first lining material and the second lining material comprises an expandable, curable resin.

15. The structure of claim 8, wherein at least one of the first and the second linings comprises a catalytic agent configured to catalyze curing of the respective first and second lining.

16. A system for forming a free-standing curvilinear structure comprising:
   at least one structural tubing;
   wherein the structural tubing comprises a lining comprising a lining material;
   a means for inflating the structural tubing; and
   a catalytic agent configured to catalyze curing of the lining material of the structural tubing;
   wherein the lining is pre-manufactured as being saturated with the lining material, and as being substantially flexible before inflation and curing of the lining material; and
   wherein after inflation and curing of the lining material, the lining comprises a solid foam material having a shape.

17. A free standing curvilinear structure comprising:
   at least one sandwich panel;
   wherein the sandwich panel comprises a first lining comprising a first lining material and a second lining comprising a second lining material;
   a means for inflating the sandwich panel; and
   a catalytic agent configured to catalyze the curing of at least one of the first and the second lining materials;
   wherein the first lining is pre-manufactured as being saturated with the first lining material, and as being substantially flexible before inflation and curing of the first lining material;

wherein the second lining is pre-manufactured as being saturated with the second lining material, and as being substantially flexible before inflation and curing of the second lining material;

wherein after inflation and curing of the first and the second lining materials, the first lining comprises a first solid foam material having a first shape and the second lining comprises a second solid foam material having a second shape.

* * * * *